(12) United States Patent
Konuma

(10) Patent No.: US 6,771,319 B2
(45) Date of Patent: Aug. 3, 2004

(54) METHOD AND APPARATUS FOR SIMULTANEOUSLY DISPLAYING BOTH MOVING AND STILL PICTURES ON A DISPLAY

(75) Inventor: Yasushi Konuma, Kanagawa (JP)

(73) Assignee: Sony Corporation (JP)

( * ) Notice: Subject to any disclaimer, the term of this patent is extended or adjusted under 35 U.S.C. 154(b) by 354 days.

(21) Appl. No.: 09/931,556

(22) Filed: Aug. 16, 2001

(65) Prior Publication Data

US 2002/0085122 A1 Jul. 4, 2002

(30) Foreign Application Priority Data

Aug. 23, 2000 (JP) ...................................... P2000-252218

(51) Int. Cl.⁷ ............................ H04N 9/74; H04N 5/21
(52) U.S. Cl. ...................................... 348/584; 348/626
(58) Field of Search ................................ 348/584, 626, 348/563, 564, 585, 598, 600, 673, 678, 687, 569; 345/629, 632, 634, 635, 636, 638; H04N 5/445, 5/21, 9/74

(56) References Cited

U.S. PATENT DOCUMENTS

| | | | |
|---|---|---|---|
| 4,855,812 A | | 8/1989 | Rokuda et al. |
| 5,247,353 A | * | 9/1993 | Cho et al. ................. 348/431.1 |
| 5,862,412 A | * | 1/1999 | Sugiyama .................... 710/68 |
| 5,978,041 A | | 11/1999 | Masuda et al. |
| 5,990,860 A | * | 11/1999 | Takeuchi ..................... 348/564 |
| 6,556,253 B1 | * | 4/2003 | Megied et al. .............. 348/565 |

FOREIGN PATENT DOCUMENTS

| | | | | |
|---|---|---|---|---|
| EP | 0 675 644 A2 | | 10/1995 | |
| EP | 0 957 631 A1 | | 11/1999 | |
| JP | 05041855 A | * | 2/1993 | ............ H04N/7/00 |
| JP | 08205028 A | * | 8/1996 | .......... H04N/5/262 |
| JP | 11239324 A | * | 8/1999 | ............ H04N/7/01 |

* cited by examiner

Primary Examiner—Sherrie Hsia
(74) Attorney, Agent, or Firm—Lerner, David, Littenberg, Krumholz & Mentlik, LLP

(57) ABSTRACT

In an image display device and method, a moving picture is composed in a graphics generator with a still picture and graphics to obtain a composite image. A moving picture area, a still picture area and a graphics area of the composite image are specified and detected as binary detection signals. The detection signals are composed with one another in levels corresponding to the drawing areas to generate a composite detection signal. On the basis of the composite detection signal, the contrast, the luminance signal and the speed modulation signal are controlled for the drawing areas of a moving picture, a still picture and graphics. When the video signals of the moving picture plane and the non-moving picture planes are composed with one another and the composite image is displayed, the optimum image quality can be achieved in each of the moving picture and the non-moving picture areas of the composite image.

12 Claims, 12 Drawing Sheets

SP: STILL PICTURE PLANE
MP: MOVING PICTURE PLANE
BP: BACKGROUND IMAGE PLANE
GP: GRAPHICS PLANE

METHOD AND APPARATUS FOR SIMULTANEOUSLY DISPLAYING BOTH MOVING AND STILL PICTURES ON A DISPLAY

CROSS-REFERENCE TO RELATED APPLICATIONS

The present application claims priority from Japanese Application No. P2000-252218, filed Aug. 23, 2000, the disclosure of which is hereby incorporated by reference herein.

BACKGROUND OF THE INVENTION

The present invention relates to a method and device for simultaneously displaying plural images having different formats such as moving pictures, still pictures, and graphics on a display.

With a television receiver, a set top box, etc., which receive digital broadcasts such as a BS (broadcast satellite) digital broadcast, image planes such as moving pictures, still pictures, and graphics can be composed with one another and displayed on a display. Further, there has been proposed a personal computer having a tuner in which the image signals of moving picture planes received through the tuner are composed with the image signals of still picture planes, graphics planes, etc., obtained by the computer and the images thus obtained are displayed on a display.

FIG. 1 is a block diagram showing an example of an image display device as described above in a case where CRT (Cathode Ray Tube) is used as a display.

In the image display device shown in FIG. 1, a compressed moving picture digital video signal is tuned by a tuner 11 and expanded by a decoder 12, and then the moving picture digital video signal thus expanded is input as a moving picture plane from the decoder 12 to a graphics generator 20.

In the graphics generator 20, a background image plane, a still picture plane, a graphics plane such as PNG (Portable Network Graphics) or MNG (Multiple-image Network Graphics) are superimposed on the input moving picture planes in a specified order and at a specified rate, and then the digital image signal after the superimposition is achieved an image plane after superimposition from the graphics generator 20.

For example, as shown in FIG. 2, the moving picture plane MP, the still picture plane SP and the graphics plane GP are superimposed on the background image plane BP in this order, thereby achieving the composite image plane of the above image planes.

The digital video signal after the superimposition from the graphics generator 20 is converted to an analog video signal comprising YUV (luminance signal, color-difference signal of red, color-difference signal of blue) component video signals in a DA (Digital to Analog) converter 31.

The luminance signal Y in the YUV analog video signal is supplied to a high band enhancing circuit 42. In the high band enhancing circuit 42, the high band components of the luminance signal Y are enhanced. The luminance signal thus enhanced in the high band and the color-difference signals UV of red and blue in the YUV analog video signal are converted to an RGB (Red, Green and Blue) analog video signal in a YUV/RGB converter 51, and then the RGB analog video signal thus converted is supplied to an RGB drive circuit 52 to drive CRT 61.

The luminance signal Y of the YUV analog video signal is supplied to a speed modulation circuit 43 in which the luminance signal Y is differentiated to generate a speed modulation signal for modulating the scanning speed of electron beams of CRT 61, and then the speed modulation signal thus generated is supplied to a speed modulation drive circuit 53 to supply speed modulation current to a speed modulation coil 62 provided to CRT 61.

The high band enhancement in the high band enhancement circuit 42 enhances the sharpness of pictures displayed on CRT 61, and also the modulation of the scanning speed of electron beams on the basis of the speed modulation signal from the speed modulation circuit 43 enhances the sharpness of pictures displayed on CRT 61.

In addition to the enhancement of the sharpness by the high band enhancement or the speed modulation as described above, the brightness, contrast, etc., of pictures displayed can be controlled by setting the input/output characteristic of the luminance signal.

In the conventional image display method and device described above, the image quality is controlled in the same level for the moving picture area ME, the still picture area SE and the graphics area GE of the image plane after the superimposition as shown in FIG. 3. That is, in the case of FIG. 1, the sharpness is uniformly enhanced in the moving picture area ME, the still picture area SE and the graphics area GE by the high band enhancement of the high band enhancement circuit 42 and the modulation of the scanning speed of electron beams on the basis of the speed modulation signal from the speed modulation circuit 43.

The enhancement of the sharpness is generally effective to the moving pictures, however, it sometimes has an adverse effect on the still pictures and the graphics pictures. In this case, if the sharpness is enhanced by the high band enhancement or the speed modulation, longitudinal lines and lateral lines look different in width or letters are obscure in some cases. Conversely, if the high band enhancement effect and the speed modulation effect are moderated because more stress is laid on the image quality of the still pictures and the graphics images, the moving pictures would be blurred.

In order to avoid this problem, the image quality of each image (picture) may be individually controlled under the single state of each image plane before these images are arranged on the same pallet, that is, under the state that each of the moving picture plane, the still picture plane and the graphics plane is in the form of an individual digital video signal.

However, with respect to the enhancement of the sharpness by the enhancement of the high band components of the luminance signal, the digital processing has lower degree of freedom in parameters than the analog processing because of the problem in number of taps of a digital filter or the like, and thus it is difficult to arbitrarily control the sharpness. Further, the enhancement of the sharpness by the modulation of the scanning speed of electron beams cannot be implemented for the digital processing.

Therefore, an object of the present invention resides in that when the video signal of a moving picture plane and the video signals of non-moving picture planes such as a still picture plane, and a graphics plane are composed with one another and then the composite image thus achieved is displayed on a display, the optimum image quality can be obtained in each of the moving picture area and the non-moving picture area of the composite image plane, and also high image quality of the overall picture can be implemented.

SUMMARY OF THE INVENTION

In order to attain the above object, an image display method according to the present invention includes generating a first video signal of a moving picture plane; generating a second video signal of non-moving picture planes; combining the first video signal and the second video signal to form a composite image plane; displaying the composite image plane on a display; specifying and detecting a moving picture area and a non-moving picture area of the composite image plane; and controlling an image quality of the moving picture area and the non-moving picture area based on a result of the detecting step.

Further, an image display device according to the present invention includes an image plane composing unit operable to combine a video signal of a moving picture plane and video signals of non-moving picture planes to form a composite image plane; a drawing area detecting unit operable to specify and detect a moving picture area and a non-moving picture area of the composite image plane; and an image quality controller operable to control an image quality of the moving picture area and the non-moving picture area on the basis of the detection result.

According to the image display method and the image display device of the present invention, the optimum image quality can be achieved in each of the moving picture area and the non-moving picture area of the composite image plane (the image plane after compositing), and the image quality of the overall image (picture) can be enhanced.

DETAILED DESCRIPTION

Preferred embodiments according to the present invention will be described hereunder with reference to the accompanying drawings.

[Overall Construction of Device]

Figure 1:
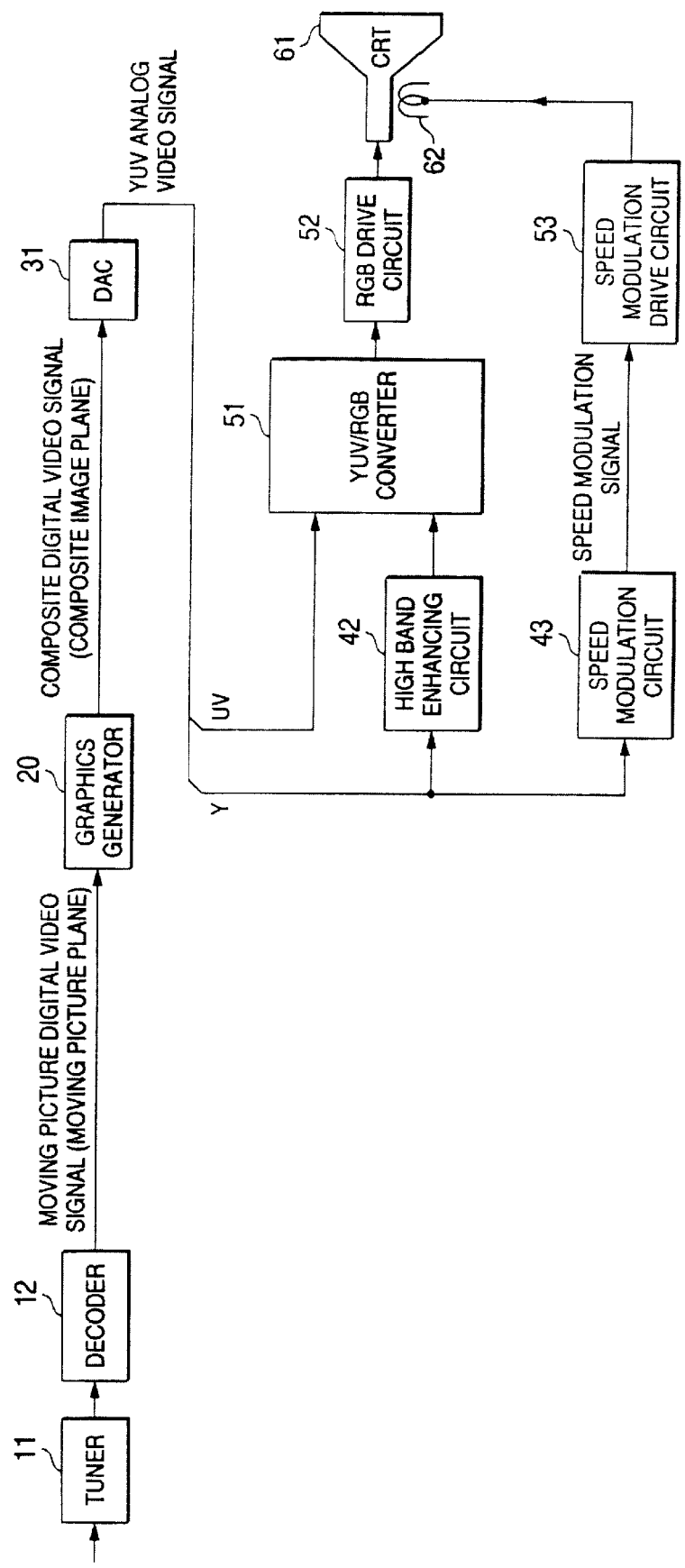
FIG. 1 is a diagram showing a conventional image display device.
Figure 2:
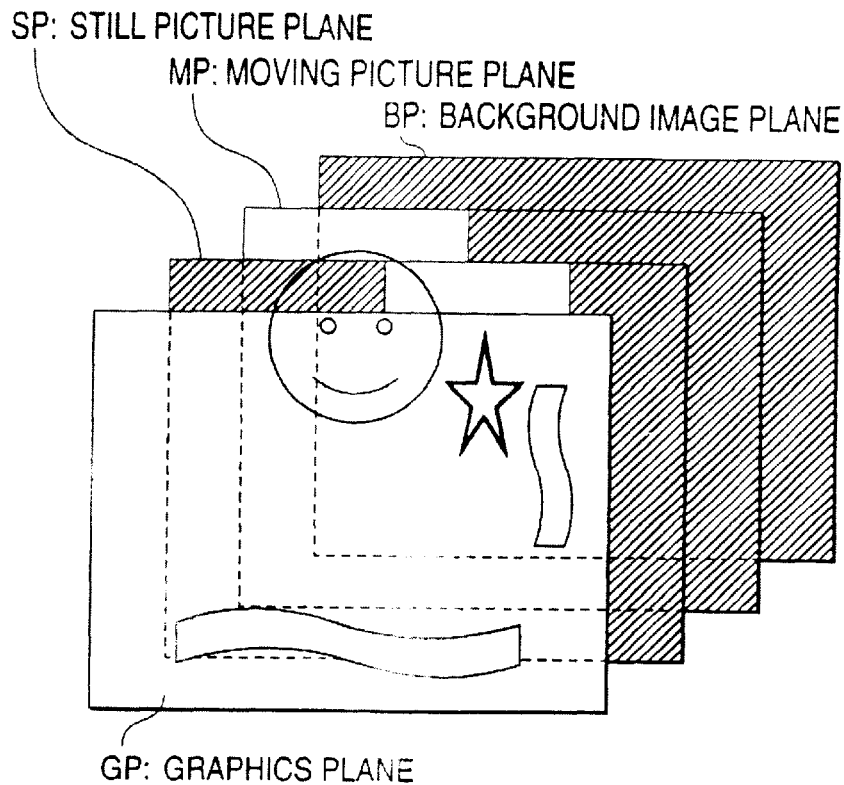
FIG. 2 is a diagram showing each image plane.
Figure 3:
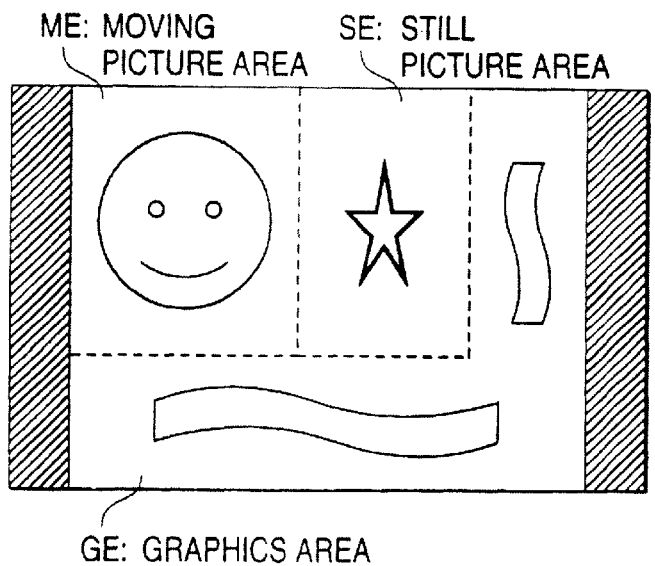
FIG. 3 is a diagram showing a composite image plane.
Figure 4:
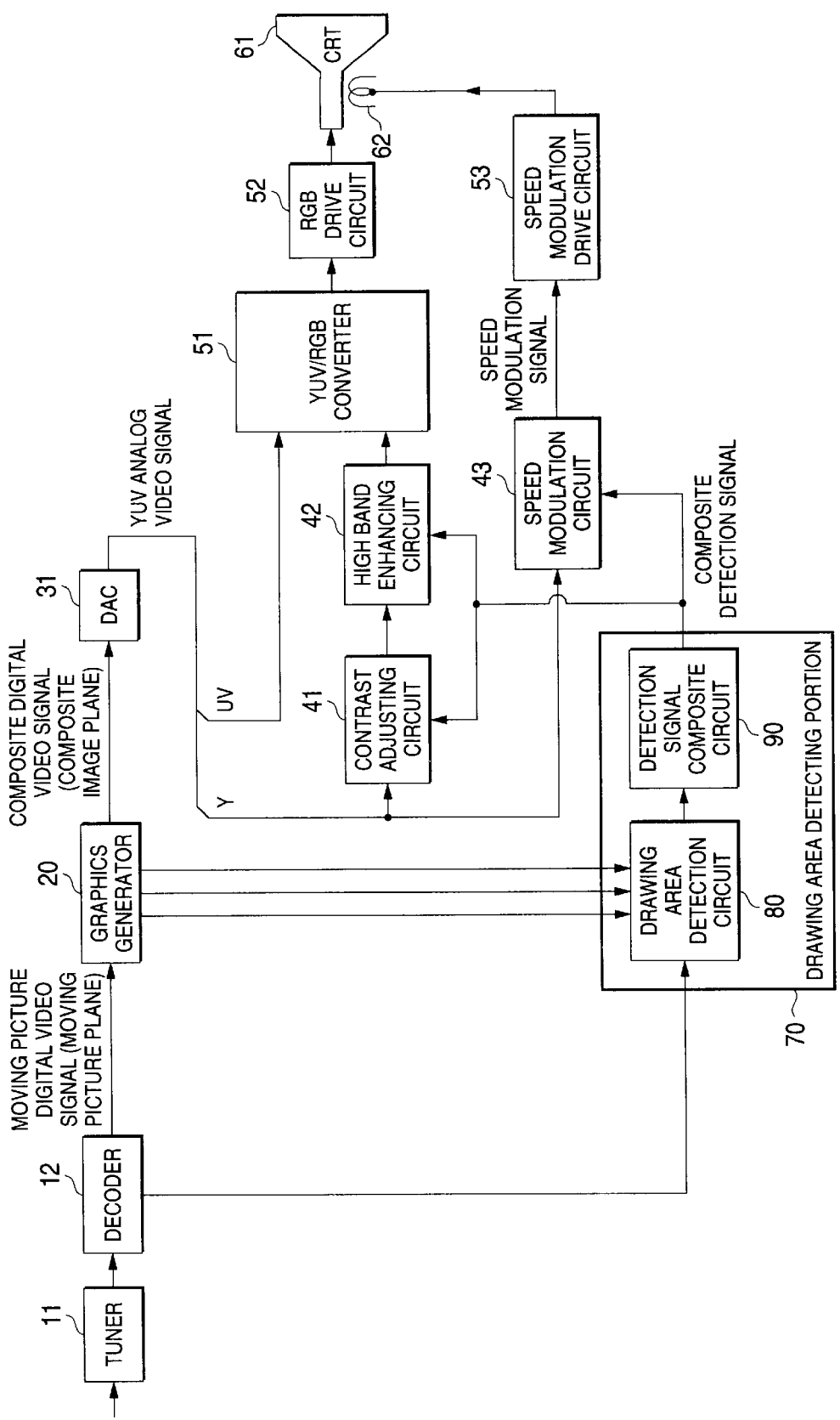
FIG. 4 is a diagram showing the overall construction in an embodiment of an image display device according to the present invention.

FIG. 4 shows the overall construction in an embodiment of an image display device according to the present invention in a case where CRT is used as a display device).

In this embodiment, a moving picture digital video signal compressed is tuned by a tuner 11 and expanded by a decoder 12, and the moving picture digital video signal thus expanded is input as a moving picture plane from the decoder 12 to a graphics generator 20.

In the graphics generator 20, the background image plane, the still picture plane and the graphics plane are superimposed on the input moving picture plane in an indicated order and at an indicated rate, and a digital video signal after the superimposition (i.e., a composite video signal) is achieved as an image plane after the superimposition (i.e., a composite image plane) from the graphics generator 20.

In this embodiment, drawing area indicating information transmitted from a broadcast side (as described later) is separated by the decoder 12, and transmitted to a drawing area detecting portion 70. In addition, the digital video signals of the moving picture plane, the still picture plane and the graphics plane before the superimposition and information indicating the composite rate of these planes are transmitted from the graphics generator 20 to the drawing area detecting portion 70.

Figure 5:
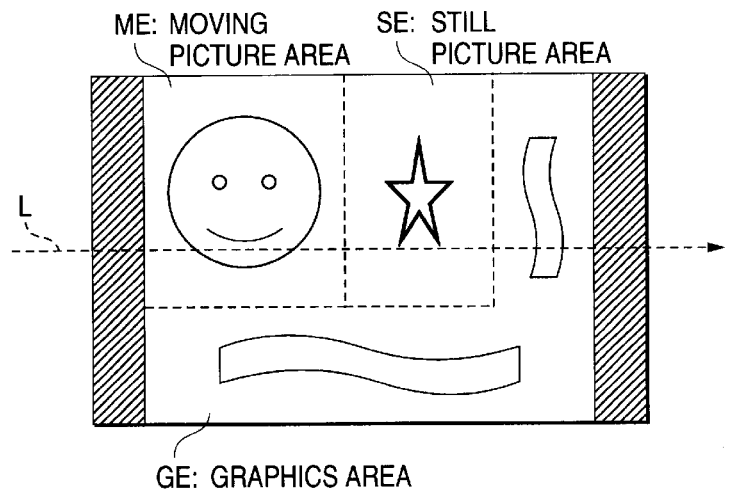
FIG. 5 is a diagram showing a composite image plane.

The drawing area detecting portion 70 comprises a drawing area detecting circuit 80 and a detection signal composing circuit 90. As described later, a moving picture area ME, a still picture area SE and a graphics area GE of a composite image plane (an image plane obtained through the superimposition of the respective planes) as shown in FIG. 5 are specified and detected in the drawing area detecting circuit 80, and a binary detection signal is achieved every drawing area as shown at the upper stages of FIG. 6. Further, the binary detection signals of these drawing areas are composed with one another in the detection signal composing circuit 90 to achieve one composite detection signal which is different in level among the drawing areas as shown at the lower stage of FIG. 6.

The composite digital video signal from the graphics generator 20 is converted to an analog video signal comprising YUV component video signals in a DA converter 31.

The luminance signal Y of the YUV analog video signals is supplied to a contrast adjusting circuit 41. In the contrast adjusting circuit 41, contrast in terms of the luminance signal Y is adjusted for each of the drawing areas of the moving picture, the still picture and the graphics on the basis of the composite detection signal from the drawing area detecting portion 70.

Besides, the luminance signal after the contrast adjustment is supplied to a high band enhancing circuit 42. In the high band enhancing circuit 42, the high band components of the luminance signal are enhanced, and the enhancement degree of the high band components is varied for each of the drawing areas of the moving picture, the still picture and the graphics on the basis of the composite detection signal from the drawing area detecting portion 70.

The luminance signal after the high band enhancement and the color-difference signals UV of red and blue in the YUV analog video signals are converted to an RGB analog video signal in a YUV/RGB converter 51, and the RGB analog video signal is supplied to an RGB drive circuit 52 to drive CRT 61.

The luminance signal Y in the YUV analog video signal is supplied to a speed modulation circuit 43. In the speed modulation circuit 43, the luminance signal Y is differentiated to generate a speed modulation signal for modulating the scanning speed of electron beams of CRT 61, and also the amplitude of the speed modulation signal is varied for each of the drawing areas of the moving picture, the still picture and the graphics on the basis of the composite detection signal from the drawing area detecting portion 70.

The speed modulation signal is supplied to a speed modulation drive circuit 53 to supply speed modulation current to a speed modulation coil 62 provided to CRT 61.

[Specification and Detection of Each Drawing Area]

(Case Where Each Drawing Area is Specified and Detected on the Basis of Drawing Area Indicating Information)

In digital broadcasts such as BS digital broadcast, each drawing area can be indicated at the broadcast side by indicating the original point at the upper left corner of the drawing area concerned on a screen and the longitudinal and lateral size every each drawing area.

In this case, in the drawing area detecting circuit 80 of the drawing area detecting portion 70, each of the drawing areas of the moving picture, the still picture and the graphics can be directly specified and detected on the basis of the drawing area indicating information as described below.

That is, in this case, every pixel in each horizontal line of the composite image plane as shown in FIG. 5, it is judged on the basis of the drawing area indicating information in the drawing area detecting circuit 80 which one of the moving picture area, the still picture area and the graphics area the pixel concerned of the horizontal line concerned belongs to. Through this judgment, a detection signal on one horizontal line L is obtained as a moving picture area detection signal, a still picture area detection signal or a graphics area detection signal as shown at the upper stages of FIG. 6, that is, it is obtained as a binary signal in which only the moving picture area detection signal has high level in the moving picture area, only the still picture area detection signal has high level in the still picture area and only the graphics area detection signal has high level in the graphics area.

In place of execution of this specification and detection of each drawing area by using a hardware circuit such as the drawing area detecting circuit 80, the specification and detection may be executed in software style according to a program by CPU.

Figure 7:
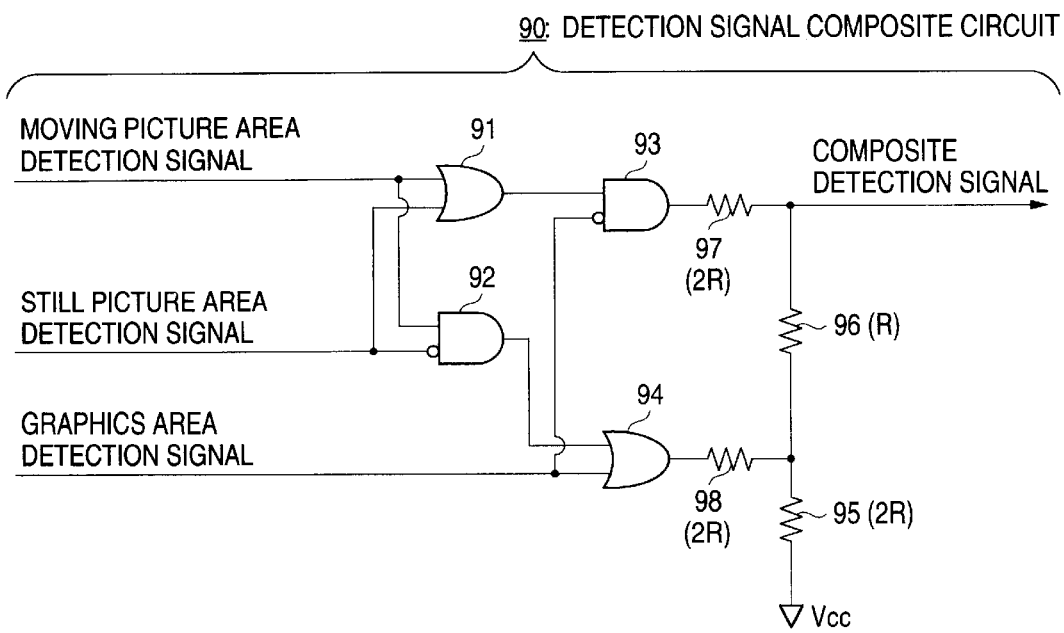
FIG. 7 is a diagram showing a detection signal composing circuit.

The detection signal composite circuit 90 is designed as follows. That is, as shown in FIG. 7, the moving picture area detection signal and the still picture area detection signal are supplied to an OR gate 91, the inverted signal of the still picture area detection signal and the moving picture area detection signal are supplied to an AND gate 92, the output signal of the inverted signal of the graphics area detection signal and the output signal of the OR gate 91 are supplied to the AND gate 93, the output signal of the AND gate 92 and the graphics area detection signal are supplied to an OR gate 94, resistors 95, 96, 97 having resistance values 2R, R, 2R respectively are connected between the output terminal of the AND gate 93 and a power source terminal at which a voltage Vcc is obtained, and a resistor 98 having a resistance value 2R is connected between the connection point of the resistors 95 and 96 and the output terminal of the OR gate 94, thereby taking out the composite detection signal from the connection point between the resistors 96 and 97.

Figure 6:
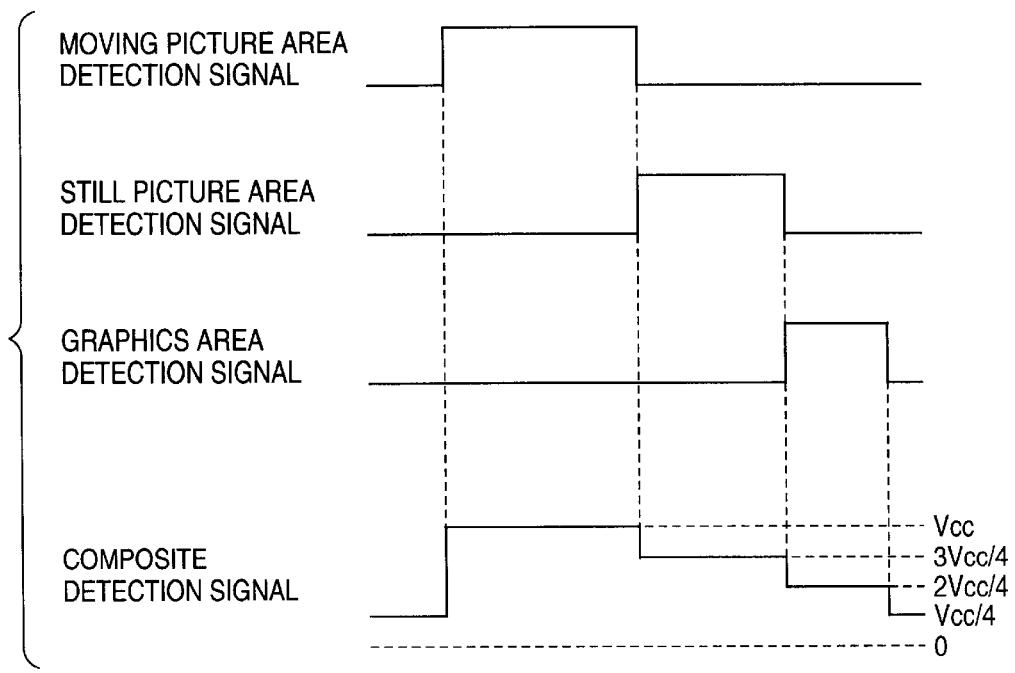
FIG. 6 is a diagram showing detection signals of respective drawing areas and a composite detection signal.

Accordingly, a multi-value signal having a voltage value of Vcc in the moving picture area in which the moving picture area detection signal has high level, a voltage value of 3Vcc/4 in the still picture area in which the still picture area detection signal has high level, and a voltage value of 2Vcc/4 in the graphics area in which the graphics area detection signal has high level is achieved as the composite detection signal as shown at the lower stage of FIG. 6.

When a background image area which does not belong to any of the moving picture area, the still picture area and the graphics area is allocated in the composite image plane, all of the moving picture area detection signal, the still picture area detection signal and the graphics area detection signal are set to low level in the background image area, so that the voltage value of the composite detection signal is equal to Vcc/4.

(Case Where Each Drawing Area is Specified and Detected on the Basis of Signal Level of Each Picture Plane)

The drawing area indicating information as described above is not necessarily given at all times, and no drawing area indicating information is given in some cases. Therefore, another embodiment of the drawing area detecting circuit 80 of the drawing area detecting portion 70 is designed so that each drawing area of the moving picture, the still picture and the graphics of the composite image plane (the image plane after the superimposition) is specified and detected on the basis of the level of the digital video signal of each of the moving picture plane, the still picture plane and the graphics plane before the superimposition as described below.

Figure 8:
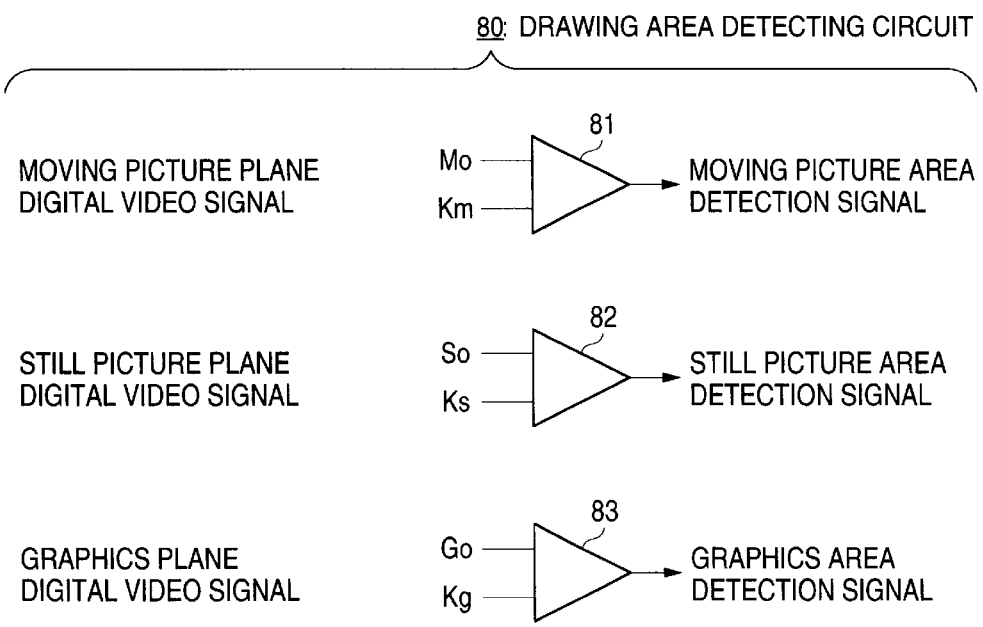
FIG. 8 is a diagram showing a drawing area detection circuit.

Specifically, as shown in FIG. 8, the drawing area detecting circuit 80 compares the digital video signal Mo of the moving picture plane with a reference level Km in a comparator 81, compares the digital video signal So of the still picture plane with a reference level Ks in a comparator 82, and compares the digital video signal Go of the graphics plane with a reference level Kg in a comparator 83.

Each reference level Km, Ks, Kg is set within a permissible level range of each of the digital video signals Mo, So, Go. Specifically, the digital video signal Mo of the moving picture plane is distributed within a broad level range, and thus the reference level Km for the moving picture plane is set to a lower value. On the other hand, since the digital video signal Go of the graphics plane has high level, the reference level Kg for the graphics plane is set to a higher value. The reference level Ks for the still picture plane is set to an intermediate value between the reference level Km for the moving picture plane and the reference level Kg for the graphics plane. The reference levels Km, Ks, Kg may be fixed or varied in accordance with the scene, the condition or the like.

Figure 9:
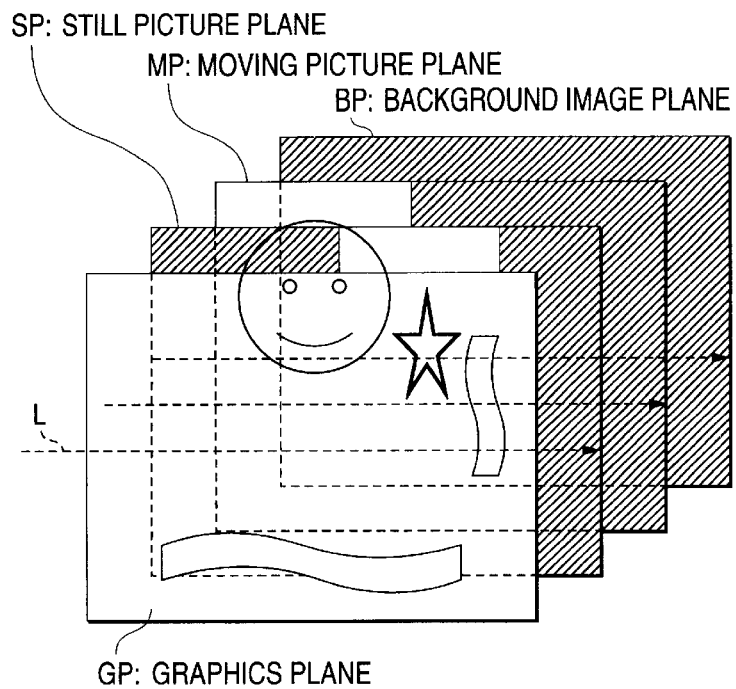
FIG. 9 is a diagram showing each image plane.
Figure 10:
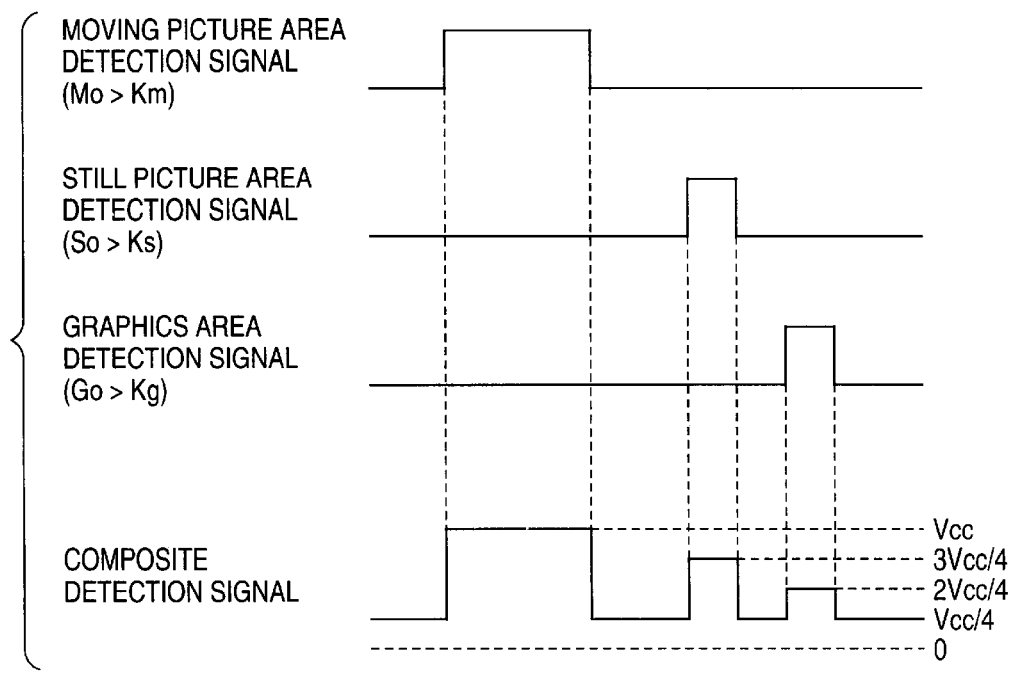
FIG. 10 is a diagram showing detection signals of respective drawing areas and a composite detection signal.

Accordingly, the outputs of the comparators 81, 82 and 83 for any one horizontal line L of the moving picture plane MP, the still picture plane SP and the graphics plane GP as shown in FIG. 9 are set as the moving picture area detection signal, the still picture area detection signal and the graphics area detection signal respectively, and as shown at the upper stages of FIG. 10, the moving picture area detection signal has high level in an area where the moving picture area can be specified because Mo>Km, the still picture area detection signal has high level in an area where the still picture area can be specified because So>Ks, and the graphics area detection signal has high level in an area where the graphics area can be specified because Go>Kg.

When these three detection signals are supplied to the detection signal composite circuit 90 thus constructed as shown in FIG. 7, a multi-value signal having a voltage value of Vcc in the moving picture area in which the moving picture area detection signal has high level, a voltage value of 3Vcc/4 in the still picture area in which the still picture area detection signal has high level, and a voltage value of 2Vcc/4 in the graphics area in which the graphics area detection signal has high level is achieved as the composite detection signal as shown at the lower stage of FIG. 10.

(Case Where Each Drawing Area is Specified and Detected on the Basis of Composite Rate of Each Image Plane)

According to the method of specifying and detecting each drawing area of the moving picture, the still picture and the graphics by comparing the level of the digital video signals Mo, So, Go of the moving picture plane, the still picture plane, the graphics plane with the reference levels Km, Ks, Kg, for example when characters are displayed, the outline of each character is detected as a drawing area, and thus the detection signal obtained from the array of these characters has high-speed pulses in which the high level and the low level are frequently repeated. Therefore, the drawing area cannot be properly detected.

Therefore, another embodiment of the drawing area detecting circuit 80 of the drawing area detecting portion 70 is preferably designed so that each drawing area of the moving picture, the still picture and the graphics of the composite image plane is specified and detected on the basis of the composite rate of the moving picture plane, the still picture plane and the graphics plane before the superimposition.

Figure 11:
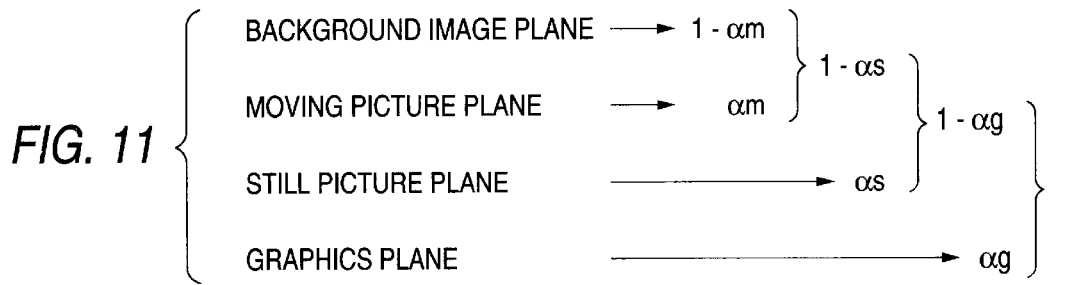
FIG. 11 is a diagram to explain the composite rate of each image plane.

The composite rate of each image plane is indicated together with the superimposing (composing) order of the respective image planes at the broadcast side or the image display device side. For example, the composite rate and the superimposing order are determined as shown in FIG. 11 like the moving picture plane is superimposed on the background image plane at a composite ratio of $(1-\alpha m):\alpha m$ (the composite image plane thus obtained is referred to as "first composite image plane"), the still picture plane is superimposed on the first composite image plane of the moving picture plane and the background image plane at a composite ratio of $(1-\alpha s):\alpha s$ (the composite image plane thus obtained is referred to as "second composite image plane"), and then the graphics plane is superimposed on the second composite image plane at a composite ratio of $(1-\alpha g):\alpha g$.

$\alpha m$, $\alpha s$, $\alpha g$ are set to a value in the range from 0 to 1. For $\alpha m=0$, no moving picture is displayed in the area concerned. For $\alpha m=1$, no background image is displayed in the area concerned. For $\alpha s=0$, no still picture is displayed in the area concerned, and for $\alpha s=1$, neither background image nor moving picture is displayed in the area concerned. For $\alpha g=0$, no graphics is displayed in the area concerned, and for $\alpha g=1$, no background image, no moving picture and no still picture are displayed in the area concerned.

$\alpha m$, $\alpha s$, $\alpha g$ are indicated every area like $\alpha m$ is set to some value $\alpha mo$ (non-zero) in some area on the screen, and it is set to a value smaller than $\alpha mo$ or equal to zero in the other areas. $\alpha s$ is set to some value $\alpha so$ (non-zero) in some area on the screen, and it is set to a value smaller than $\alpha so$ or equal to zero. $\alpha g$ is set to some value $\alpha go$ (non-zero) in some area on the screen, and it is set to a value smaller than $\alpha go$ or equal to zero.

Figure 12:
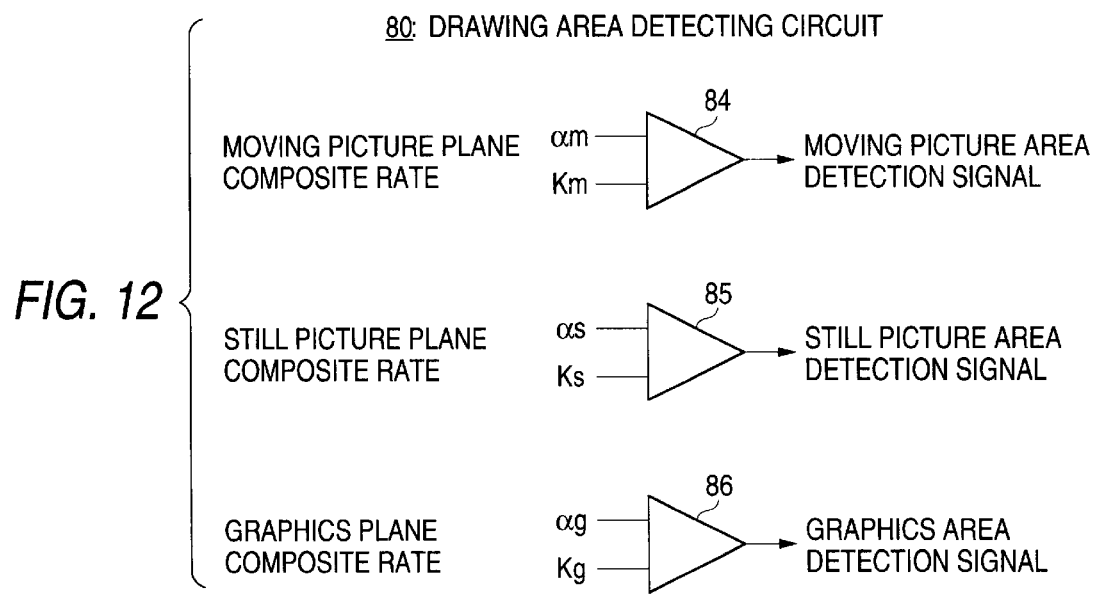
FIG. 12 is a diagram showing a drawing area detection circuit.

In this case, in the drawing area detecting circuit 80, as shown in FIG. 12, the composite rate $\alpha m$ of the moving picture plane is compared with the reference level km in a comparator 84, the composite rate $\alpha s$ of the still picture plane is compared with the reference level ks in a comparator 85, and the composite rate $\alpha g$ of the graphics plane is compared with the reference level kg in a comparator 86.

The reference levels km, ks, kg may be fixed or varied in accordance with the scene, the condition or the like. However, they are set to smaller values than the above values $\alpha mo$, $\alpha so$, $\alpha go$ respectively.

Figure 13:
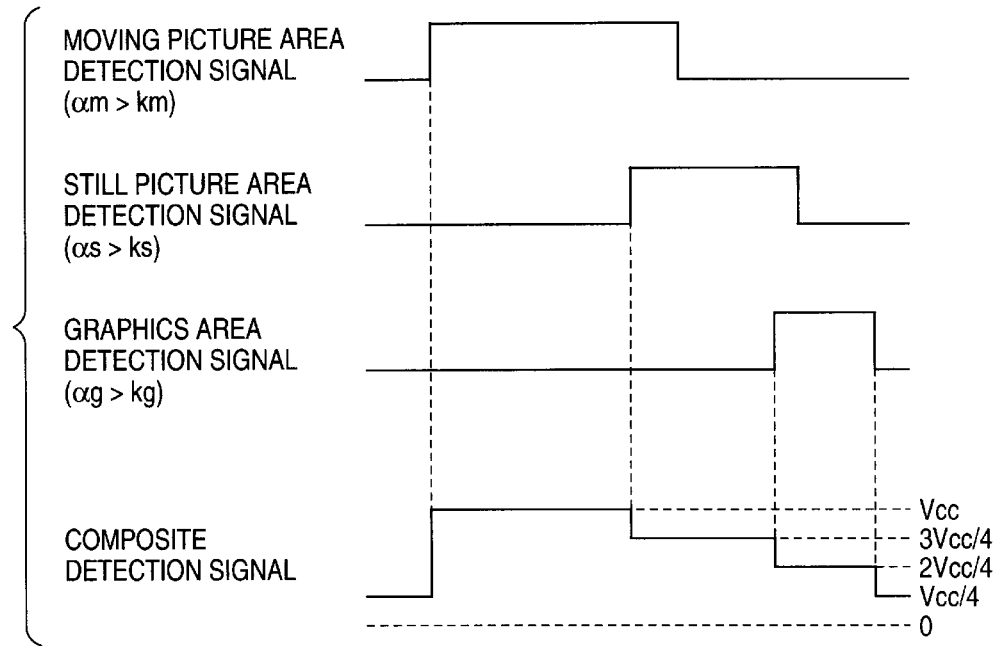
FIG. 13 is a diagram showing detection signals of respective drawing areas and a composite detection signal.

Accordingly, the outputs of the comparators 84, 85 and 86 for some one horizontal line are set as the moving picture area detection signal, the still picture area detection signal and the graphics area detection signal, and as shown at the upper stages of FIG. 13, the moving picture area detection signal has high level in an area where the moving picture area can be specified because $\alpha m=\alpha mo$ and $\alpha m>km$, the still picture area detection signal has high level in an area where the still picture area can be specified because $\alpha s=\alpha so$ and $\alpha s>ks$, and the graphics area detection signal has high level in an area where the graphics area can be specified because $\alpha g=\alpha go$ and $\alpha g>kg$.

Figure 14:
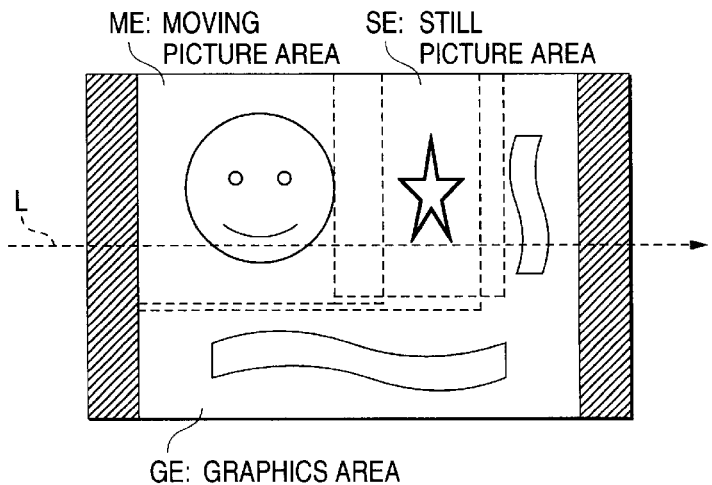
FIG. 14 is a diagram showing each drawing area specified on the basis of the detection signal of each drawing area of FIG. 13.

However, in this case, under some state of the detection signal of the output of the drawing area detecting circuit 80, the area specified as the moving picture area ME, the area specified as the still picture area SE and the area specified as the graphics area GE may be partially overlapped with one another as shown at the upper stages of FIG. 13 and FIG. 14.

When these three detection signals are supplied to the detection signal composite circuit 90 constructed as shown in FIG. 7, a multi-value signal having a voltage value of Vcc in the area where only the moving picture area detection signal has high level, a voltage value of 3Vcc/4 in the area which is obtained by excluding the area where the graphics area detection signal has high level from the area where the still picture area detection signal has high level, and a voltage value of 2Vcc/4 in the area where the graphics area detection signal has high level is obtained as the composite detection signal as shown at the lower stage of FIG. 13, and thus the moving picture area ME, the still picture area SE and the graphics area GE can be specified under the state that they are not overlapped with one another as shown in FIG. 5.

(Case Where the Drawing Region Specification and Detection Methods of the Above Cases are Used in Combination)

Figure 15:
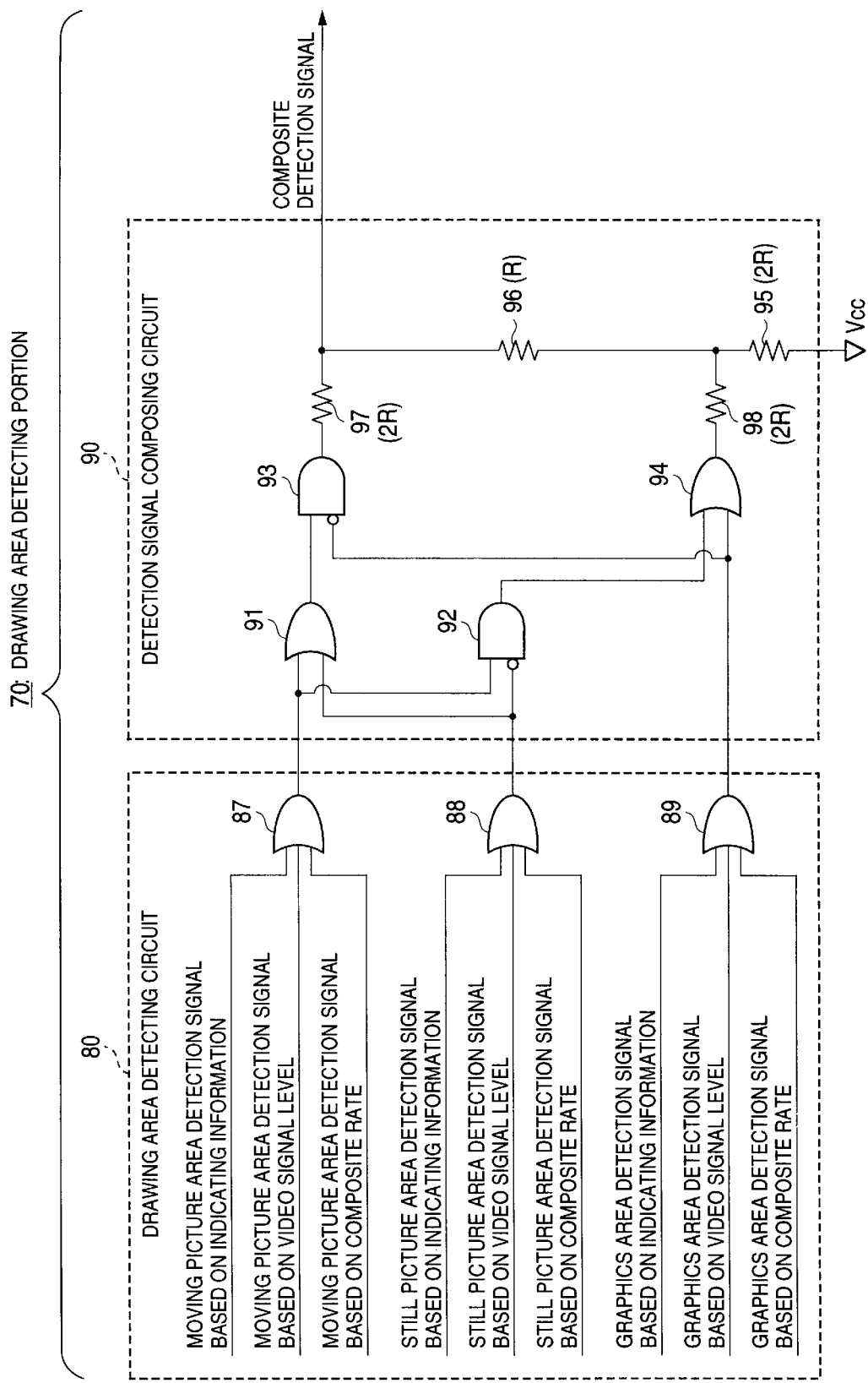
FIG. 15 is a diagram showing a drawing area detection portion.

In this case, as shown in FIG. 15, in the drawing area detecting circuit 80, the respective detection signals based on the drawing area indicating information, the respective detection signals based on the signal level of each image plane, and the respective detection signals based on the composite rate of each image plane are collected every detection signal of the same type drawing area, and then supplied to OR gates 87, 88 and 89. The outputs of the OR gates 87, 88 and 89 are supplied as the moving picture area detection signal, the still picture area detection signal and the graphics area detection signal respectively to a detection signal composing circuit 90 constructed as shown in FIG. 7.

Figure 16:
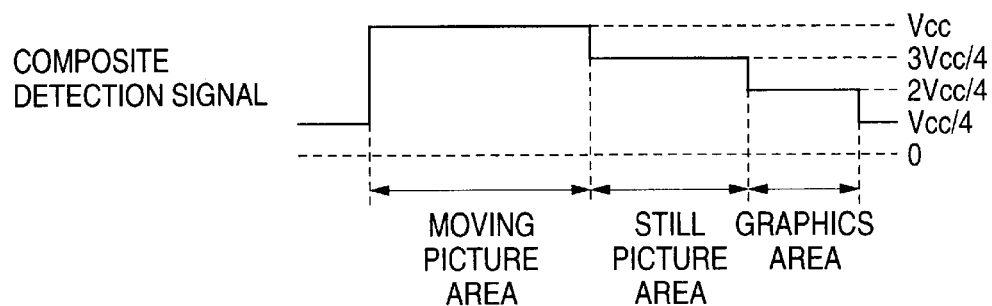
FIG. 16 is a diagram showing an output composite detection signal of the drawing area detector shown in FIG. 15.

With the construction as described above, the same composite detection signal as shown at the lower stage of FIG. 6 and the lower stage of FIG. 13 is obtained as the composite detection signal of the output of the detection signal composing circuit 90 as shown in FIG. 16.

[Control of Image Quality]

According to the image display device shown in FIG. 4, the contrast is adjusted for each of the drawing areas of the moving picture, the still picture and the graphics with respect to the luminance signal of the composite image on the basis of the composite detection signal obtained from the drawing area detecting portion 70 according to each of the specifying and detecting methods described above in the contrast adjusting circuit 41. In the high band enhancing circuit 42, the enhancement degree of the high band components of the luminance signal is varied every drawing area of the moving picture, the still picture and the graphics, and in the speed modulation circuit 43, the amplitude of the speed modulation signal is varied every drawing area of the moving picture, the still picture and the graphics.

Figure 17:
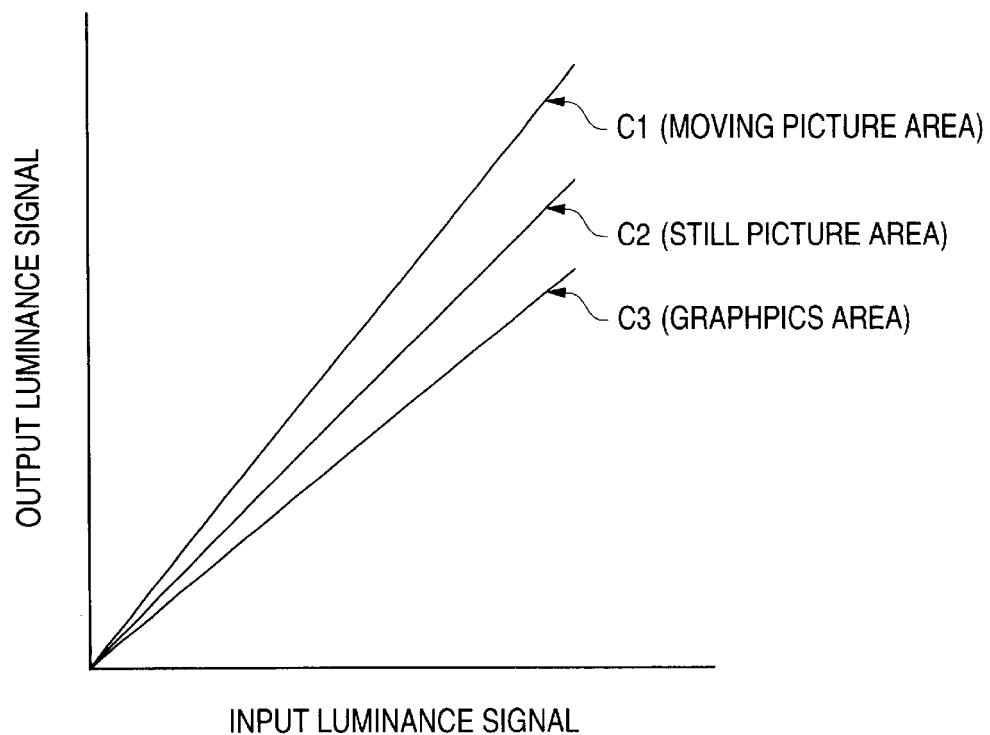
FIG. 17 is a diagram to explain contrast adjustment.

That is, in the contrast adjusting circuit 41, the input/output characteristic of the luminance signal is set to adjust the contrast. The input/output characteristic is set to such a characteristic that the contrast is enhanced like a straight line C1 of FIG. 17 in the moving picture area where the composite detection signal is equal to Vcc, the contrast is equal to about an intermediate level like a straight line C2 of FIG. 17 in the still picture area where the composite detection signal is equal to 3Vcc/4, and the contrast is lowered like a straight line C3 of FIG. 17 in the graphics area where the composite detection signal is equal to 2Vcc/4.

For the moving picture, it is preferable that the contrast is high. However, it is unfavorable to further enhance the contrast in the graphics because the graphics are originally created as images having high contrast. According to this case, the optimum contrast can be achieved for each of the moving picture, the still picture and the graphics in accordance with the difference in properties among these pictures (images).

Figure 18:
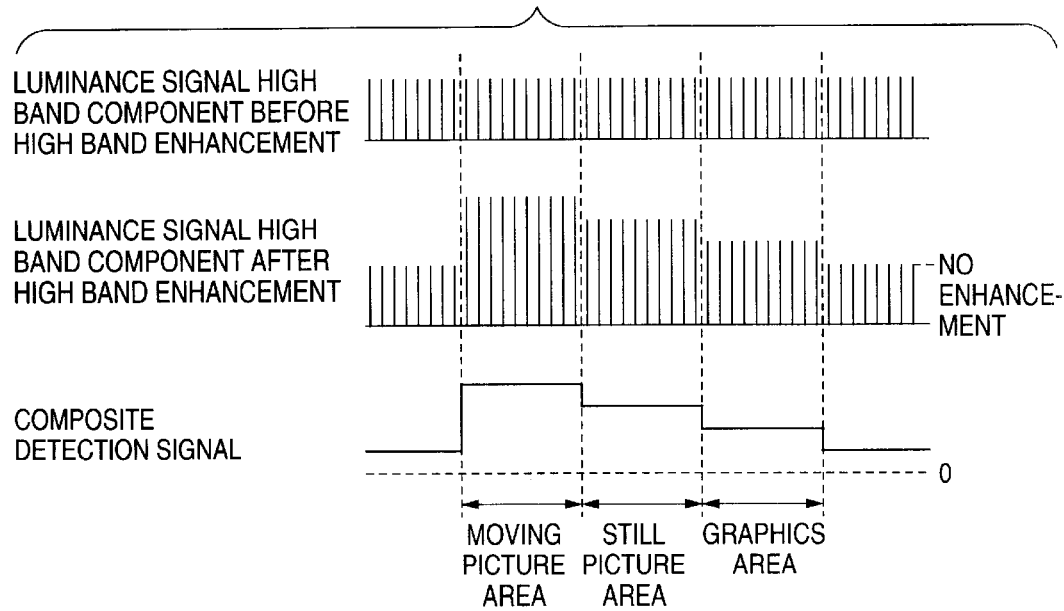
FIG. 18 is a diagram to explain enhancement control of high band components of a luminance signal.

In the high band enhancing circuit 42, the high band components of the luminance signal are enhanced, and thus the sharpness of the image is enhanced. The enhancement degree of the high band components is set to the highest level in the moving picture area, about an intermediate level in the still picture area and the lowest in the graphics area as shown in FIG. 18.

Accordingly, the enhancement degree of the sharpness based on the enhancement of the high band is equal to the maximum level in the moving picture, the intermediate level in the still picture area and the minimum level in the graphics area, so that the optimum sharpness is achieved every area in accordance with the difference in properties among the pictures (images).

Figure 19:
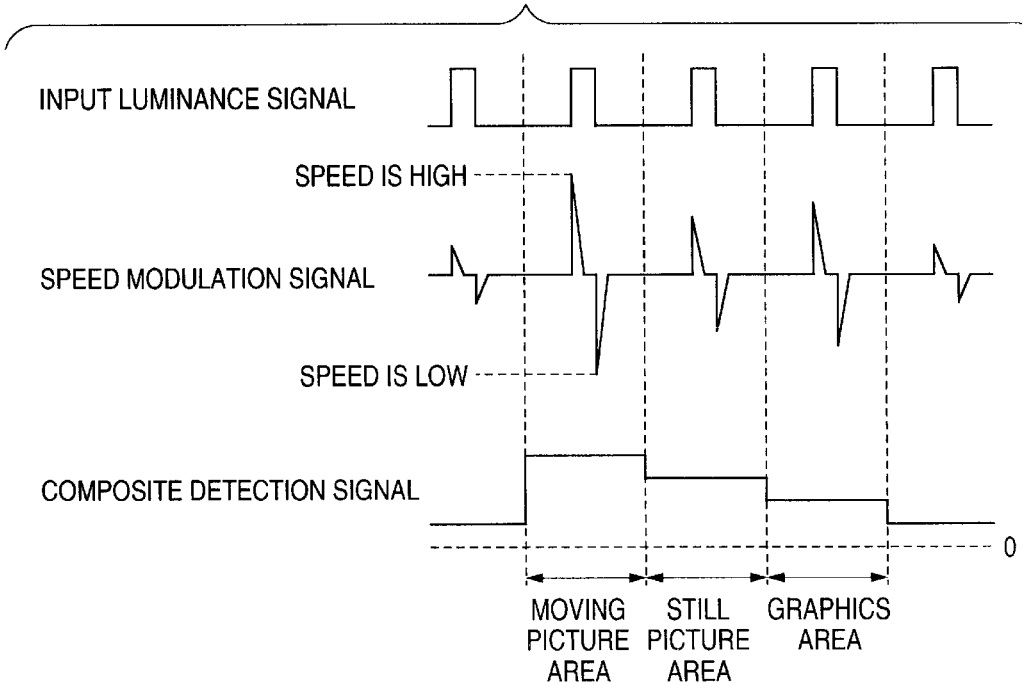
FIG. 19 is a diagram to explain amplitude control of a speed modulation signal.

In the speed modulation circuit 43, the luminance signal is differentiated to generate a speed modulation signal for modulating the scanning speed of electron beams of CRT 61 and supply speed modulation current to the speed modulation coil 62, thereby enhancing the sharpness of the image. The amplitude of the speed modulation signal is set to the highest level in the moving picture area, to about an intermediate level in the still picture area and to the lowest level in the graphic area as shown in FIG. 19.

Accordingly, the enhancement degree based on the speed modulation is equal to the highest level in the moving picture area, to about the intermediate level in the still picture area and to the lowest level in the graphics area, so that the optimum sharpness can be achieved for each area in accordance with the difference in properties of these pictures (images).

[Other Embodiments]

The adjustment of the contrast and the sharpness may be set to the opposite characteristics to the above case between the still picture area and the graphics area, that is, the contract and the sharpness may be lower in the still picture area than in the graphics area. Or, the contrast and the sharpness may be set to the same level between the still picture area and the graphics area.

Figure 20:
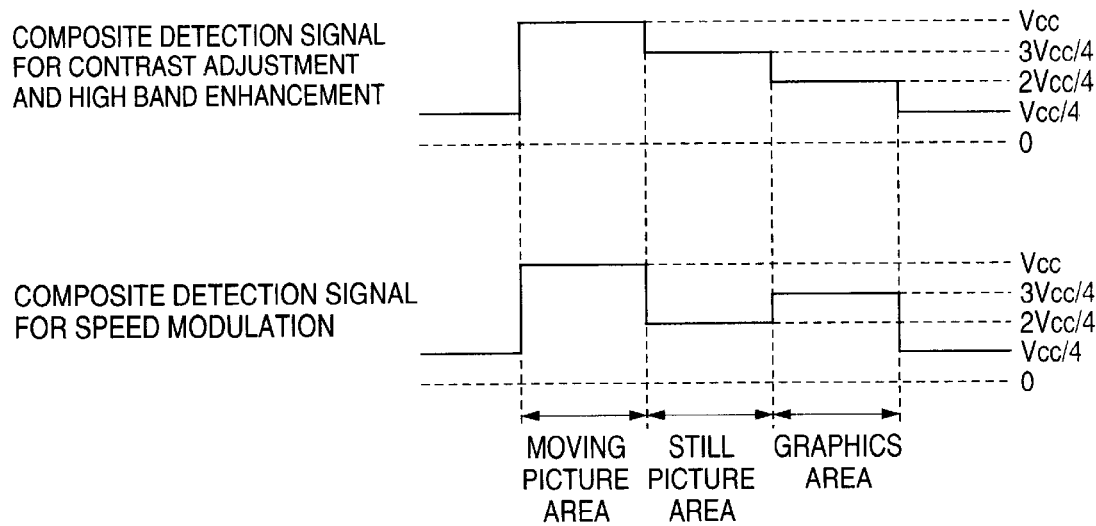
FIG. 20 is a diagram showing another example of the composite detection signal.
Figure 21:
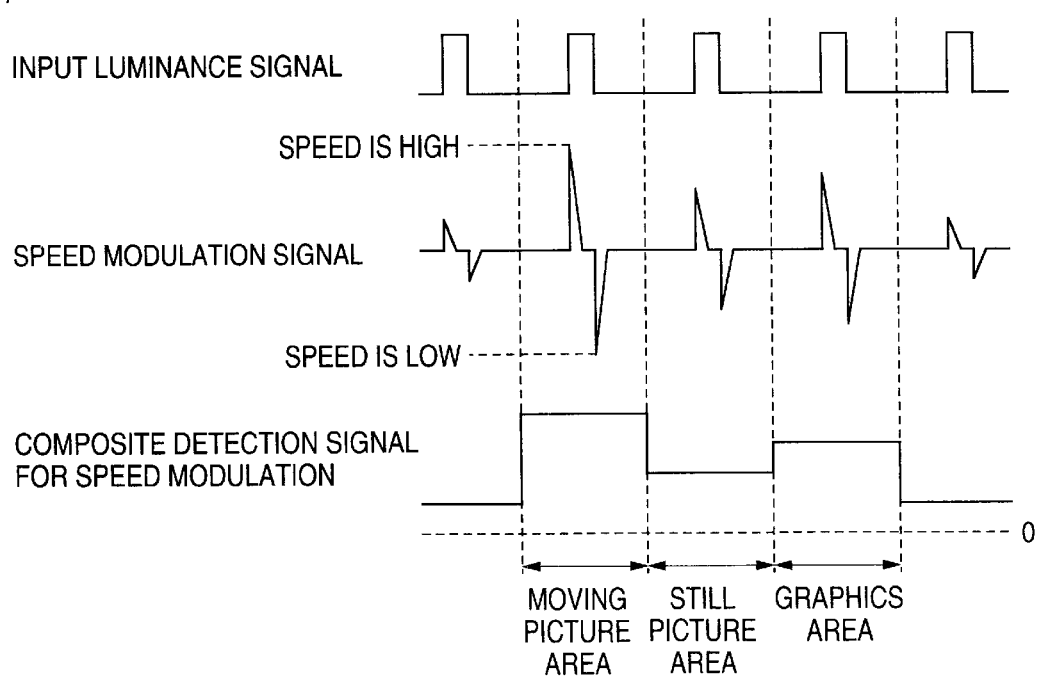
FIG. 21 is a diagram to explain amplitude control of the speed modulation signal.

Therefore, for example, the detection signal composing circuit 90 constructed as shown in FIG. 7 may be modified to be used for the contrast adjustment and the high band enhancement. In this case, a composite detection signal as shown at the upper stage of FIG. 20 is obtained, a detection signal composing circuit for speed modulation is provided in parallel to the detection signal composing circuit for contrast adjustment and high band enhancement, and a composite detection signal having such a pulse waveform that the voltage values of the composite detection signal shown at the upper stage of FIG. 20 are replaced by each other between the still picture area and the graphics area is achieved as the composite detection signal for speed modulation as shown at the lower stage of FIG. 20 by the detection signal composing circuit for speed modulation. Further, the contrast adjustment and the sharpness enhancement based on the high band enhancement are carried out on the basis of the composite detection signal at the upper stage of FIG. 20, and also the enhancement of the sharpness based on the speed modulation is carried out on the basis of the composite detection signal at the lower stage of FIG. 20 so that the amplitude of the speed modulation signal is set to the highest level in the moving picture area, to an intermediate level in the graphics area and to the lowest level in the still picture area as shown in FIG. 21.

The construction of the detection signal composing circuit 90 shown in FIG. 7 may be modified so that a composite signal having a voltage value that is highest in the moving picture area and is the same value in both the still picture area and the graphics area can be achieved as a common composite detection signal for contrast adjustment, high band enhancement and speed modulation, whereby the contrast adjustment, the sharpness enhancement based on the high band enhancement and the sharpness enhancement based on the speed modulation are performed on the basis of the composite detection signal.

Further, in the above embodiment, the contrast and the sharpness are controlled every drawing area of the moving picture, the still picture and the graphics on the basis of the composite detection signal from the detection signal composing circuit 90. However, the following modification may be made. That is, the detection signal composing circuit 90 is not provided, and the moving picture area detection signal, the still picture area detection signal and the graphics area detection signal from the drawing area detection circuit 80 may be supplied to the contrast adjusting circuit 41, the high band enhancing circuit 42 and the speed modulation circuit 43 as control signals therefore, whereby the contrast, the high band enhancement and the speed modulation are controlled in accordance with the level states of the three detection signals. This control may be performed in the software style.

The above embodiment is applied to the composition (superimposition) of the moving picture plane, the still picture plane and the graphics plane. However, the present invention is not limited to the composition of these pictures, and it may be applied to the composition (superimposition) of image planes, for example, a text plane such as subtitles, a sprite plane for indicating an arrow, etc. In this case, for the image planes such as the text plane, and the sprite plane, the contrast and the sharpness of the drawing areas thereof may be controlled in the same manner as the still picture area or the graphics area.

The image quality parameters to be adjusted every drawing area are not limited to the contrast, the high band enhancement degree of the luminance signal and the degree of the speed modulation, but any parameters such as the frequency, brightness, gamma characteristic, DC transmission rate, and black level reproduction degree of luminance signal components to be enhanced for the sharpness enhancement may be used insofar as the image quality can be controlled on the basis of these parameters.

Further, the above embodiment uses CRT as a display. However, LCD (Liquid Crystal Display), PDP (Plasma Display), PALCD (Plasma Addressed Liquid Crystal Display) or the like may be used as the display.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. An image display method, comprising:
   generating a first video signal of a moving picture plane;
   generating a second video signal of non-moving picture planes;
   combining said first video signal and said second video signal to form a composite image plane;
   displaying said composite image plane on a display;
   specifying and detecting a moving picture area and a non-moving picture area of said composite image plane; and
   controlling an image quality of said moving picture area and said non-moving picture area based on a result of said detecting step.

2. The image display method as claimed in claim 1, wherein said specifying and detecting steps are carried out on the basis of drawing area indicating information.

3. The image display method as claimed in claim 1, wherein said specifying and detecting steps include comparing a video signal level of each of said moving picture plane and said non-moving picture planes with a reference level.

4. The image display method as claimed in claim 1, wherein said specifying and detecting steps include comparing a composite rate of each of said moving picture plane and said non-moving picture planes with a reference level.

5. The image display method as claimed in claim 1, wherein said specifying and detecting steps include specifying and detecting said moving picture area and said non-moving area as binary detection signals, and then specifying and detecting said detection signals as a multi-valued composite detection signal obtained by combining said detection signals in levels corresponding to said respective areas.

6. The image display method as claimed in claim 1, wherein said image quality corresponds to sharpness of an image, and parameters indicating said sharpness are adjusted in each of said moving picture area and said non-moving picture area based upon a result of said detecting step.

7. An image display device, comprising:
   an image plane composing unit operable to combine a video signal of a moving picture plane and video signals of non-moving picture planes to form a composite image plane;
   a drawing area detecting unit operable to specify and detect a moving picture area and a non-moving picture area of said composite image plane; and
   an image quality controller operable to control an image quality of said moving picture area and said non-moving picture area on the basis of said detection result.

8. The image display device as claimed in claim 7, wherein said drawing area detecting unit specifies and detects said moving picture area and said non-moving picture area on the basis of drawing area indicating information.

9. The image display device as claimed in claim 7, wherein said drawing area detecting unit specifies and detects said moving picture area and said non-moving picture area by comparing a video signal level of each of said moving picture plane and said non-moving picture plane with a reference level.

10. The image display device as claimed in claim 7, wherein said drawing area detecting unit specifies and detects said moving picture area and said non-moving picture area by comparing a composite rate of each of said moving picture plane and said non-moving picture planes with a reference level.

11. The image display device as claimed in claim 7, wherein said drawing area detecting unit includes means for specifying and detecting said moving picture area and said non-moving picture area as binary detection signals, and means for composing said detection signals in levels corresponding to said areas to generate a multi-valued composite detection signal.

12. The image display device as claimed in claim 7, wherein said image quality control unit adjusts sharpness of image parameters in said moving picture area and said non-moving picture area on the basis of said detection result.

* * * * *